United States Patent [19]
Gamble, Jr.

[11] Patent Number: 5,899,322
[45] Date of Patent: May 4, 1999

[54] RETENTION CLIP FOR CONVEYOR BELTS

[75] Inventor: Robert N. Gamble, Jr., Waukesha, Wis.

[73] Assignee: Regina-Emerson Company, Waukesha, Wis.

[21] Appl. No.: 08/701,502

[22] Filed: Aug. 22, 1996

[51] Int. Cl.[6] .................................................. B65G 17/06
[52] U.S. Cl. ........................................................ 198/853
[58] Field of Search .......................................... 198/853

[56] References Cited

U.S. PATENT DOCUMENTS

| | | | |
|---|---|---|---|
| 4,832,187 | 5/1989 | Lapeyre | 198/851 |
| 4,893,710 | 1/1990 | Bailey et al. | 198/853 |
| 4,993,544 | 2/1991 | Bailey et al. | 198/834 |
| 5,020,659 | 6/1991 | Hodlewsky | 198/853 |
| 5,024,321 | 6/1991 | Lapeyre | 198/853 |
| 5,058,732 | 10/1991 | Lapeyre | 198/852 |
| 5,083,660 | 1/1992 | Horton | 198/853 |
| 5,156,262 | 10/1992 | Horton | 198/834 |
| 5,156,264 | 10/1992 | Lapeyre | 198/852 |
| 5,174,439 | 12/1992 | Spangler et al. | 198/853 |
| 5,217,110 | 6/1993 | Spangler et al. | 198/852 |
| 5,247,789 | 9/1993 | Abbestam et al. | 59/78 |
| 5,253,749 | 10/1993 | Ensch | 198/853 |
| 5,293,989 | 3/1994 | Garbagnati | 198/853 |
| 5,303,818 | 4/1994 | Gruettner et al. | 198/850 |
| 5,305,869 | 4/1994 | Damkjaer | 198/689.1 |
| 5,332,084 | 7/1994 | Greve | 198/853 |
| 5,335,768 | 8/1994 | Schladweiler | 198/853 |
| 5,339,946 | 8/1994 | Faulkner et al. | 198/494 |
| 5,431,275 | 7/1995 | Faulkner | 198/853 |
| 5,435,435 | 7/1995 | Chiba et al. | 198/853 |
| 5,439,099 | 8/1995 | Bos et al. | 198/853 |
| 5,482,156 | 1/1996 | Damkjaer | 198/853 |

OTHER PUBLICATIONS

Morse Catalog PT–93, p. A10, "ANSI Roller Chain Assembly Parts", 1993.
Rexnord Engineering Manual, p. 81, "Multiflex Chain Assembly", 1985.
Rexnord Engineering Manual, p. 77, "Chain Installation and Replacement", 1993.
Rexnord Engineering Manual, p. 78, "Replacement 5900 Series" 1993.
Rexnord Advertisement, "New Rex 5998 MatTop Chain Has 45% Open Area", Oct. 1995.
Intralox Catalog, "Product Line Adrasion Resistance System", Sep. 1994.
Rexnord Advertisement, "New TwistLock hinged plug prevents plug loss, allows easy pin access", Jul. 1993.

*Primary Examiner*—Joseph E. Valenza
*Attorney, Agent, or Firm*—Jacobson, Price, Holman & Stern, PLLC

[57] ABSTRACT

A conveyor belt is made from rows of plastic conveyor belt modules having interfitting end members in adjacent rows connected by a lateral pivot rods extending through aligned holes in the end members. To retain the pivot rods in place an outermost end member of each module is provided with an aperture intersecting its pivot rod hole at a location adjacent one end of the pivot rod. A rotary cylindrical stop member is fitted in the aperture to block the end of the pivot rod. The stop member has a lateral through-bore which can be aligned with the pivot rod hole when the stop member is rotated in the aperture to a release position so that the pivot rod can be removed through the stop member.

25 Claims, 5 Drawing Sheets

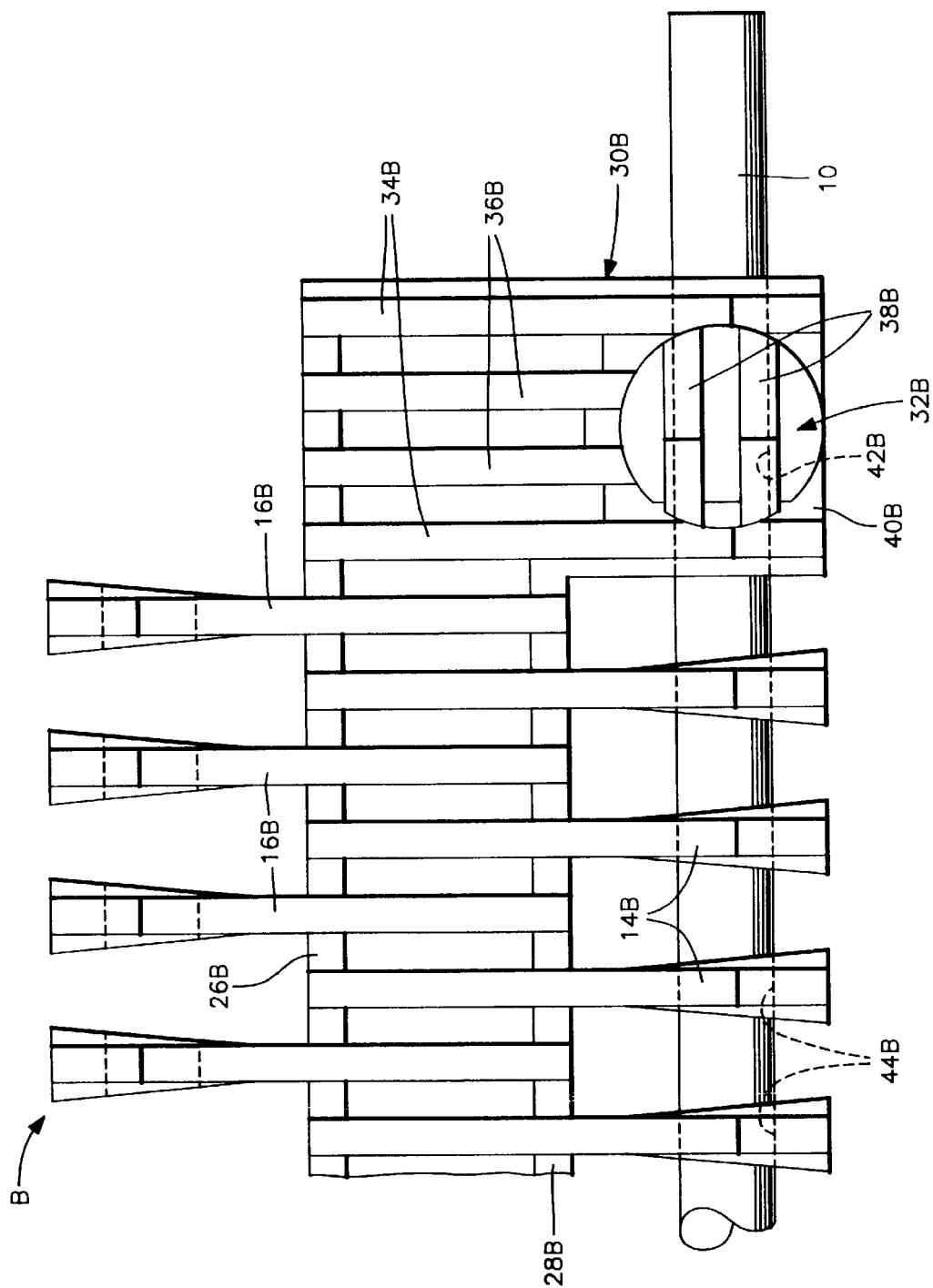

RETENTION CLIP FOR CONVEYOR BELTS

BACKGROUND OF THE INVENTION

This invention relates generally to modular conveyor belts in which a plurality of plastic belt modules having interfitting end members are held together by pivot rods extending through holes in the end members. More particularly, the invention relates to a novel form of retention means for the pivot rods.

Modular conveyors of the kind referred to are very well known in the art and various systems have evolved for retaining the pivot rods in place. One earlier proposal, for example, for plastic pivot rods, comprises expanding or "mushrooming" the ends of the rod over the outer lateral surfaces of the respective conveyor module. This arrangement, however, involves destruction of the rod in the event it needs to be removed, for example to replace a worn conveyor module.

Another earlier proposal involved press fitting the ends of the pivot rods, which, preferably were knurled, into preformed apertures in the laterally outermost end, members of the respective conveyor modules. Again, however, complications arise in removing the rods.

More recent rod retention systems employ removable stop members for the pivot rod ends locatable in the laterally outermost end members of the conveyor modules. Such removable stop members may, for example, comprise axial end caps fitting in the ends of the pivot rod openings, or removable clips adapted to fit or swing across the ends of the pivot rod openings. While these systems reduce problems involved in removing the pivot rods, they tend to complicate the structure and may even introduce additional problems in fitting and removal of the stop members themselves.

SUMMARY OF THE INVENTION

It is an object of the invention to provide a novel pivot rod retention system for modular conveyors of the kind described which is simple to manufacture and install and which uses stop members for the ends of the pivot rods which can readily be manipulated between rod-blocking and rod-releasing positions.

Another object of the invention is to provide a pivot rod retention system as above in which the stop members can be manipulated from the top or from the bottom of a conveyor module.

Still another object of the invention is to provide a system as above in which the stop members are not removed from the respective conveyor modules during normal use and remain part of a module, but wherein the stop members can be removed if it becomes necessary, for example, to replace a stop member.

In fulfillment of the above and any other objects, the stop members according to the invention comprise plastic rotary barrel or plug-shaped cylindrical elements snap-fitted into apertures in the laterally outermost end members of the conveyor modules on an axis intersecting the pivot rod opening. The rotary elements each have a lateral throughbore which, by suitably rotatably orienting the rotary element can be aligned with the pivot rod opening to allow the pivot rod to be removed through the rotary member. To lock the pivot rods in place, the rotary members are rotatably oriented to misalign the respective bores and pivot rod openings so that the rotary members effectively block the ends of the rod openings.

For ribbed conveyor modules, the outermost end members may comprise multi-rib structures with the ribs cut away partially to accommodate the apertures for the rotary members, and the rotary members may have a matching rib structure on their upper surface which is useful as an alignment guide for the rotary member. When, for example, the rib structures on a rotary member and the respective conveyor module mutually align and register, the rotary member is in the pivot rod-blocking position and when the rib structure on the rotary member is perpendicular to the rib structure on the conveyor module, the rotary member is in the pivot rod-releasing position. The rib structure also provides a convenient means for manipulating the rotary members from the top of the conveyor module, defining for example, a screwdriver head receptacle.

The rotary members may be split at the bottom to define another screwdriver head receptacle facilitating manipulation from the bottom of the conveyor module and also providing resiliency to the rotary member useful for snapping same into place. The bottom of the rotary member may have a circumferential ridge or flange which releasably snaps into a corresponding recess at the bottom of the conveyor module to retain the rotary member in place.

Alignable indents and detents may be provided on the module and the rotary members to positively locate the rotary members in their in-use pivot rod-blocking positions.

Additional features and advantages of the invention will become apparent from the ensuing description and claims read in conjunction with the attached drawings.

BRIEF DESCRIPTION OF THE DRAWINGS

FIG. 9 is a view similar to FIGS. 2 but showing the pivot rod retaining member fitted to the conveyor module and showing insertion/removal of a pivot rod.

DESCRIPTION OF PREFERRED EMBODIMENT

Figure 1:
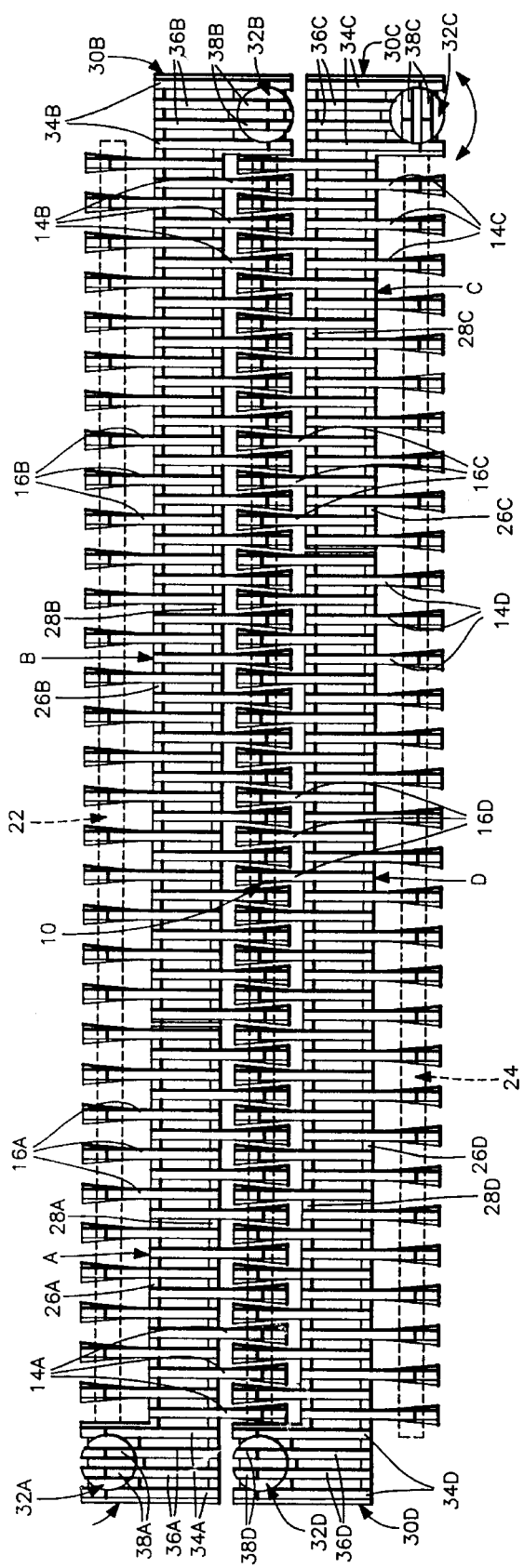
FIG. 1 is a plan view of a section of a modular conveyor according to the invention.
Figure 1A:
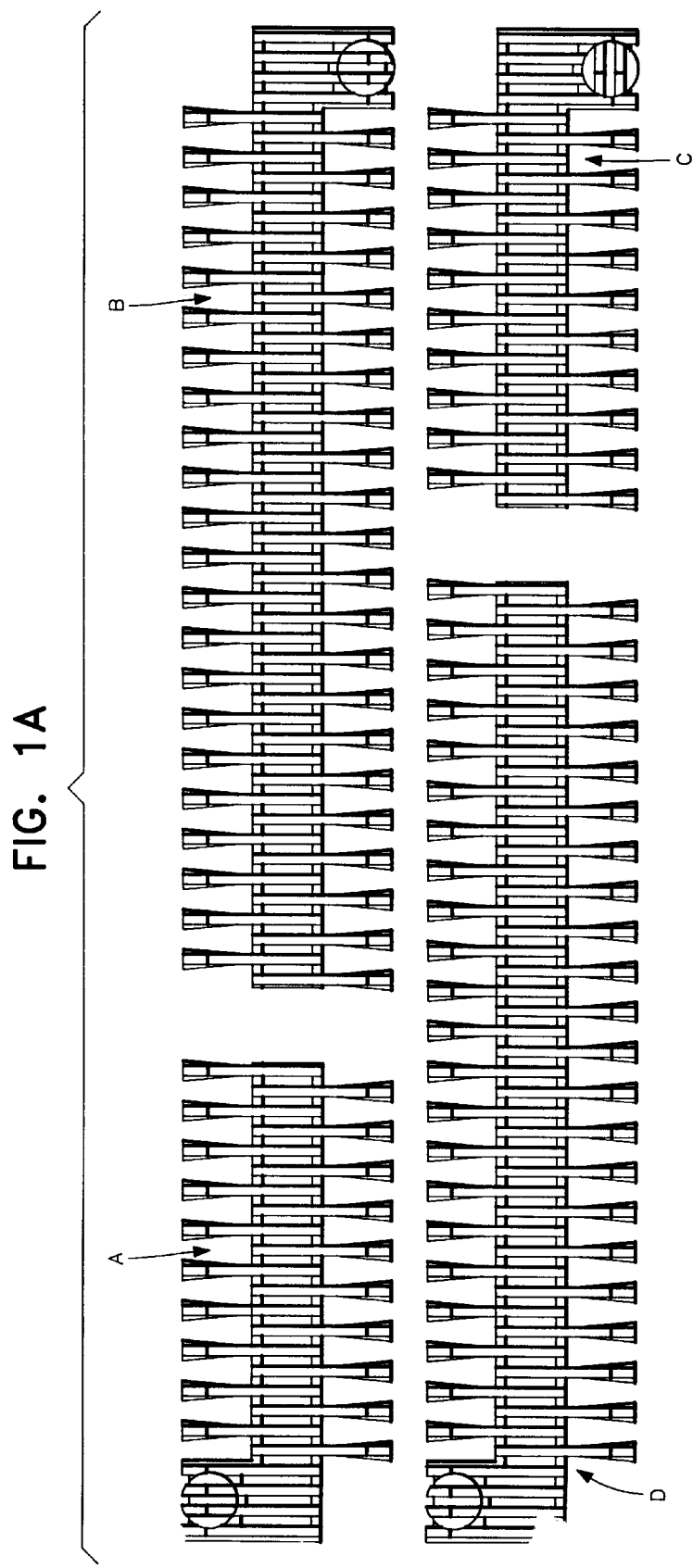
FIG. 1A is an exploded view of the conveyor section shown in FIG. 1.
Figure 2:
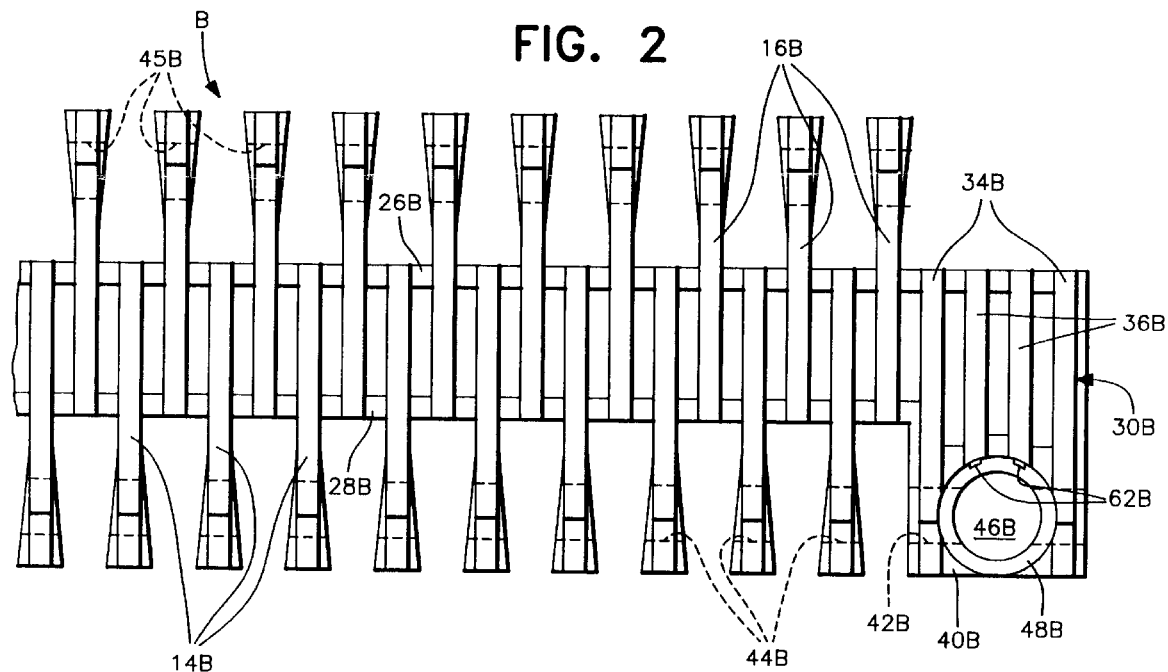
FIG. 2 is an enlarged plan view of an end part of one of the conveyor modules.
Figure 3:
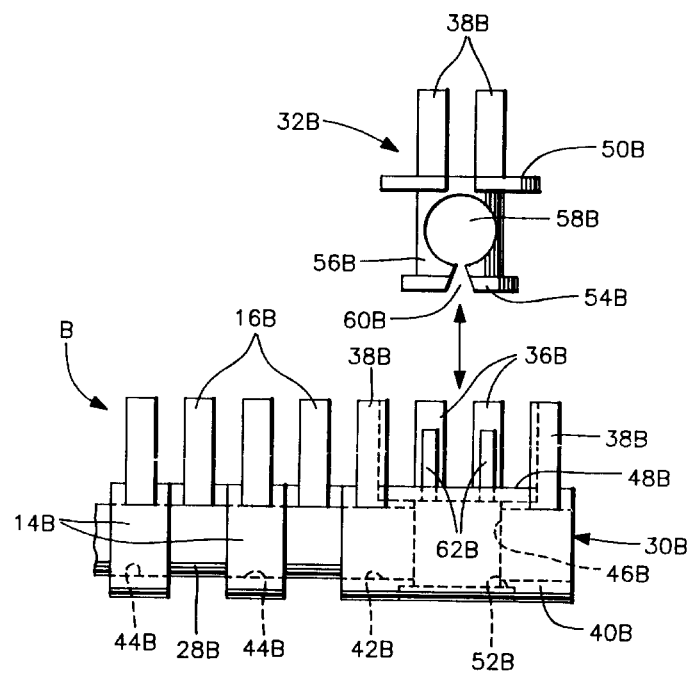
FIG. 3 is an elevational view of the end part of the conveyor module showing a fit-in pivot rod retaining member.
Figure 4:
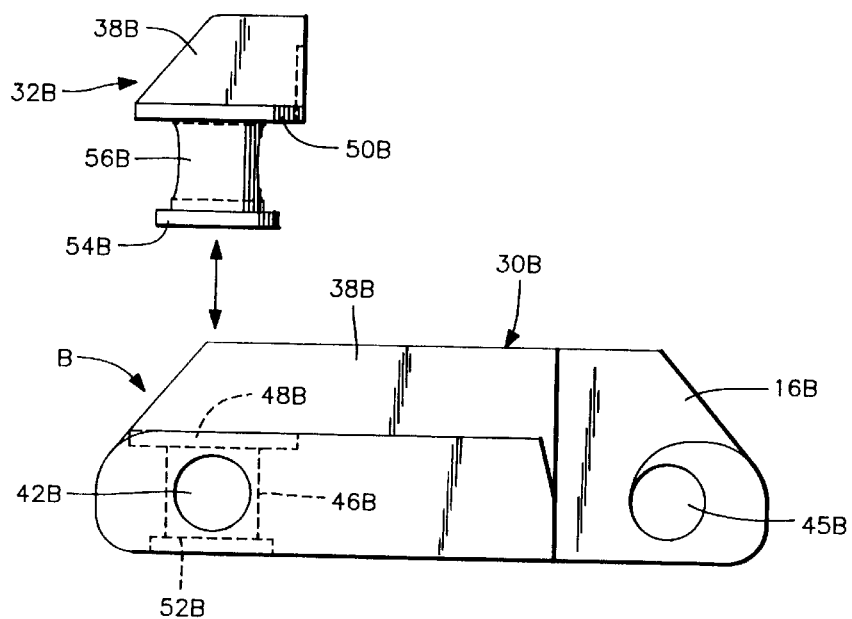
FIG. 4 is an end view of the conveyor module retaining member.
Figure 5:
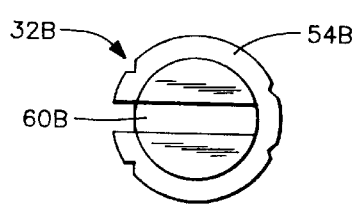
FIG. 5 is an underneath plan view of the retaining member.
Figure 6:
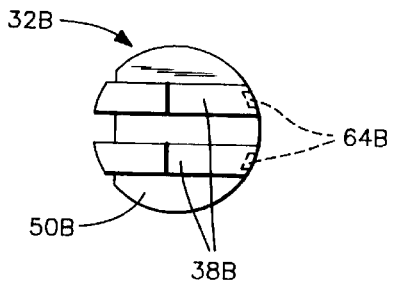
FIG. 6 is a top plan view of the retaining member.
Figure 7:
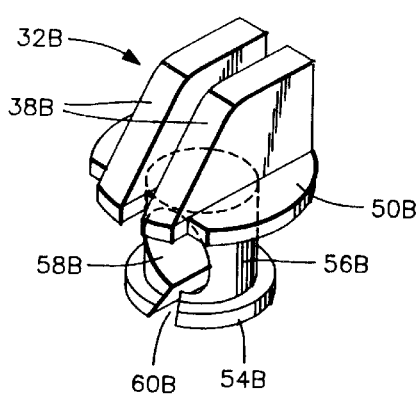
FIG. 7 is a perspective view of the retaining member.
Figure 8:
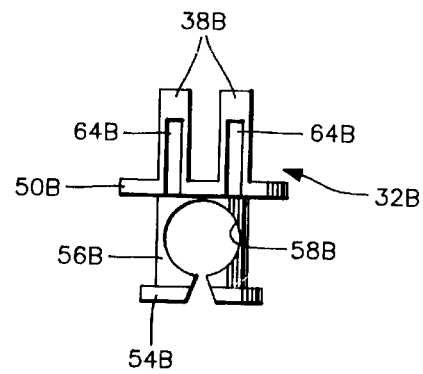
FIG. 8 is an end elevational view of the retaining member.

FIG. 1 shows a section of a modular conveyor comprising two rows of molded plastic modules A, B, C, D connected together by a pivot rod 10. In the illustrated conveyor there is a shorter side modular (A,C) and a longer side module (B,D) in each module row, the modules being arranged, in know manner, in a bricklay configuration. The invention is also applicable to conveyors of similar design having one or more intermediate modules in each row between the respective side modules.

The modules have alternating forwardly and rearwardly directed ribs 14A, 16A in module A, 14B, 16B in module B, 14C, 16C in module C and 14D, 16D in module D. The outer rib ends have holes, not seen in FIG. 1, to receive a pivot rod such as rod 10 or other rods 22, 24 for joining the module rows together. The module ribs 14A, 16A–14D, 16D are in each case integrally molded to respective lateral spines 26A, 28A–26D, 28D.

One side of each module is provided with a longitudinally offset or stepped side piece 30A–30D so that the side pieces in adjacent module rows nest with each other as seen in FIG. 1. The projecting portions of the side pieces are fitted with rotatable elements 32A–32D forming stop members for the pivot rods 10, 22, 24 as will be described. The side pieces have pairs of outer ribs 34A–34D and inner ribs 36A–36D matching the rib pattern and spacing in the main body of each module. The inner ribs 36A–36D are cut short to accommodate the stop members 32A–32D and each stop member itself has a pair of rib sections 38A–38D on its upper surface to form completions of the ribs 36A–36D. When the stop members are oriented to align the rib sections 38A–38D with ribs 36A–36D the stop members block the ends of the pivot rods and the conveyor modules are connected securely together. The stop members can, however, be selectively rotated through 90° (see stop member 32C in FIG. 1) to allow a pivot rod to be removed through the stop member, as will be described, so that the conveyor modules can be mutually separated. Conveniently, to aid in ready identification, the stop members 32A–32D may be molded in a different color plastic form the conveyor modules.

The construction of the conveyor modules and the stop members will be described in more detail below with reference to FIGS. 2–9 which show only module B and stop member 32B. It will be understood, that the other modules and stop members are of corresponding construction.

The projecting end of side piece 30B has a solid base 40B with a horizontal through-bore 42B which aligns with corresponding through-bores 44B in the ends of ribs 14B for passage of pivot rod 10. Ribs 16B have like through-bores 45B for the passage of pivot rod 22 (FIG. 1). Base 40B is further provided with a vertical aperture 46B intersecting through-bore 42B for receipt of stop member 32B. The top surface of base 40B is provided with an annular recess 48B around aperture 46B to receive an annular top flange 50B of the stop member and the bottom surface of base 40B is provided with a further annular recess 52B around aperture 46B to receive an annular bottom flange 54B of the stop member with a snap fit.

Stop member 32B has a cylindrical body 56B with a horizontal through-bore 58B for passage of rod 10 and a slit base portion defining an inverted-V groove 60B opening into through-bore 58B. The V groove provides resiliency to the opposite sides of the stop member to facilitate pushing the stop member into aperture 46B in the side piece 30B from above, the diameter of bottom flange 54b being somewhat larger than that of the aperture. Groove 60B provides a receptacle for a screwdriver head to rotate the stop member from below and the space between the rib sections 38B offers a similar receptacle to rotate the stop member from above. the snap fit of the stop member in the side piece 30B provides effective retention of the stop member but the stop member is sufficiently resilient to be forced upwardly out of aperture 46B if required. The top flange 50B of the stop member prevents the stop member from being moved down through aperture 46B.

The forward ends of ribs 36B are provided with ridges 62B forming detents which cooperate with corresponding depressions 64B forming indents in the back ends of rib sections 38B on the stop member 32B. The ridges and depressions positively locate the stop member in its operative position blocking the pivot rod 10. As previously indicated, when the rod is to be released to dismantle the conveyor modules, stop member 32B is rotated through 90° to the position shown in FIG. 9 wherein the rod 10 can be withdrawn through the through-bore 58B which is brought into alignment with through-bore 42B.

In the illustrated embodiment the rotational axis of stop member 32B is aligned with the axis of through-bore 58B but these axes can also be offset.

It is evident that the stop member provides a simple and effective retention means for the pivot rod well adapted to fulfilling the objects of the invention. While only a preferred embodiment of the invention has been described, the invention is not limited thereby and modifications can be made within the scope of the attached claims.

I claim:

1. A modular conveyor belt comprising a plurality of conveyor belt modules having interfitting end members held together by pivot rods extending laterally across the belt through pivot rod holes in the end members, wherein outermost ones of the end members are provided with stop members for retaining the pivot rods in place each stop member comprising a rotatable cylindrical element fitted in a respective end member in intersecting relation with the pivot rod hole in the end member at a location adjacent an outer end of the respective pivot rod for blocking said pivot rod hole in a first rotational position of the stop member, the cylindrical element having a lateral through-bore alignable with the pivot rod hole in the end member in a second rotational position of the stop member to permit removal of the pivot rod through the stop member.

2. A conveyor belt as claimed in claim 1 wherein the conveyor modules comprise plastic moldings and the stop members comprise further plastic moldings, each stop member being snap fitted in an aperture in a respective end member on an axis perpendicular to a respective pivot rod axis.

3. The conveyor belt as claimed in claim 2 wherein the axis of the stop member intersects the pivot rod axis.

4. The conveyor belt as claimed in claim 2 wherein the stop member has a lower end with a flange of larger diameter than said aperture, said flange being releasably snap-fitted in a corresponding recess in a base surface in the respective end member.

5. The conveyor belt as claimed in claim 4 wherein a lower end portion of the stop member has a slit opening into said through-bore to facilitate insertion of the stop member into said aperture and removal of the stop member from said aperture.

6. The conveyor belt as claimed in claim 5 wherein said slit defines a receiving formation for a screwdriver head for rotating the stop member between the first and second rotational positions.

7. The conveyor belt as claimed in claim 4 wherein the stop member has an upper end with a further flange of larger diameter than said aperture to prevent the stop member passing through the aperture from above.

8. The conveyor belt as claimed in claim 2 including interfitting indent and detent means on the stop member and end member respectively for positively locating the stop member in the first rotational position.

9. The conveyor belt as claimed in claim 2 wherein the end member has an upper surface formed with upstanding longitudinal rib formations and wherein the stop member has corresponding upstanding rib sections forming continuations of said rib formations in the first rotational position of the stop member.

10. The conveyor belt as claimed in claim 9 wherein the rib sections of the stop member define a receiver therebetween for a screwdriver head for rotating the stop member between the first and second rotational positions.

11. The conveyor belt as claimed in claim 9 wherein the rib formations and rib sections have respective end faces formed with interfitting indents and detents for positively locating and retaining the stop member in the first rotational position.

12. The conveyor belt as claimed in claim 1 wherein the modules are arranged in rows in a bricklay configuration with at least two modules in each row.

13. The conveyor belt as claimed in claim 12 wherein each module includes alternating oppositely directed ribs with outer ends defining said end members and a stepped side piece defining an outermost end member in which a respective stop member is fitted, the side piece including rib formations corresponding to said ribs and the stop member including rib sections to form continuations of said rib formations in the first rotational position of the stop member.

14. A plastic conveyor module for a modular conveyor belt said module having spaced end members at opposite ends of the module to interfit with like end members of an adjacent module of the belt, aligned lateral pivot rod holes in the end members to receive a lateral pivot rod for securing the modules together and an outermost end member at one end of the module formed with a further aligned pivot rod hole and a cylindrical aperture intersecting the pivot rod hole to receive a cylindrical stop member therein for selectively blocking the pivot rod hole adjacent one end of a pivot rod.

15. The conveyor module as claimed in claim 14 which includes alternating forwardly and rearwardly directed longitudinal ribs having ends defining the end members and a stepped side piece at one end of the module forming said outermost end member.

16. The conveyor module in claim 15 wherein the side piece includes longitudinal rib formations matching said ribs including a first pair of rib formations terminating adjacent said aperture.

17. The conveyor module as claimed in claim 16 wherein said rib formations each have an end face adjacent said aperture with a projecting detent on said end fact to interfit with a corresponding indent on said stop member.

18. The conveyor module as claimed in claim 16 wherein said rib formations include additional rib formations extending beyond said first rib formations on opposite sides of said aperture.

19. The conveyor module as claimed in claim 14 wherein the pivot rod hole in the outermost end member and said aperture have intersecting axes.

20. The conveyor module as claimed in claim 14 in combination with a cylindrical plastic stop member to be fitted in said aperture, the stop member having a lateral through-bore therein alignable with the pivot rod hole in the outermost end member when the stop member is fitted in said aperture and suitably rotationally oriented.

21. The conveyor module as claimed in claim 20 wherein the conveyor module and the stop member are molded in different color plastics.

22. A cylindrical plastic stop member for use in an aperture in a conveyor module as claimed in claim 16, said stop member comprising a cylindrical body with a lateral through-bore therein an upper end, a lower end, and a pair of projecting parallel rib elements on the upper end of the body.

23. The stop member as claimed in claim 22 wherein the rib elements have end faces formed with indents to receive corresponding detents on the conveyor module.

24. The stop member as claimed in claim 22 wherein the body includes peripheral flanges at the upper and lower ends thereof.

25. The stop member as claimed in claim 24 wherein the lower end of said body has a lateral slit opening into said through-bore.

\* \* \* \* \*